US008750934B2

(12) United States Patent
 Lucidarme (10) Patent No.: US 8,750,934 B2
(45) Date of Patent: Jun. 10, 2014

(54) MULTI-ANTENNA COMMUNICATION SYSTEM FOR COMMUNICATING BETWEEN AT LEAST TWO TELECOMMUNICATIONS DEVICES

(75) Inventor: Thierry Lucidarme, Montigny-le-Bx (FR)

(73) Assignee: Thales, Neuilly sur Seine (FR)

( * ) Notice: Subject to any disclaimer, the term of this patent is extended or adjusted under 35 U.S.C. 154(b) by 126 days.

(21) Appl. No.: 13/380,770

(22) PCT Filed: Jun. 28, 2010

(86) PCT No.: PCT/EP2010/059119
 § 371 (c)(1),
 (2), (4) Date: Feb. 21, 2012

(87) PCT Pub. No.: WO2010/149789
 PCT Pub. Date: Dec. 29, 2010

(65) Prior Publication Data
 US 2012/0155562 A1 Jun. 21, 2012

(30) Foreign Application Priority Data
 Jun. 26, 2009 (FR) ...................................... 09 03132

(51) Int. Cl.
 *H04B 7/04* (2006.01)
(52) U.S. Cl.
 USPC ........................................ 455/562.1; 370/232
(58) Field of Classification Search
 USPC ......... 455/562.1; 375/267, 347; 370/232, 238
 See application file for complete search history.

(56) References Cited

U.S. PATENT DOCUMENTS 7,394,724 B1   7/2008 Uzes
(Continued)

FOREIGN PATENT DOCUMENTS

| EP | 1227539 A1 | 7/2002 |
|---|---|---|
| WO | 01/20815 A1 | 3/2001 |
| WO | 2008/086416 A2 | 7/2008 |

OTHER PUBLICATIONS

Frode Bohagen et al.: "Construction and Capacity Analysis of High-Rank Line-of-Sight MIMO Channels," Wireless Communications and Networking Conference, 2005 IEEE New Orleans, LA, USA Mar. 13-17, 2005, Piscataway, NJ, USA, IEEE, vol. 1, Mar. 13, 2005, pp. 432-437.

(Continued)

*Primary Examiner* — Sam Bhattacharya
(74) *Attorney, Agent, or Firm* — Baker & Hostetler LLP (57) ABSTRACT

A system is provided for communications between at least two telecommunications devices, at least one being onboard an aircraft, said devices comprising means for sending and/or receiving digital data, said data being classed in at least two categories, the first category corresponding to critical data, the second category corresponding to non-critical data. The data are sent on M antennas and received on N antennas. A matrix H of dimension M×N representative of the multi-antenna propagation channel is estimated and the data are sent according to a mode of transmission selected from among at least two multi-antenna modes. A first robust mode uses a scheme of Alamouti type, a second high-speed mode uses a scheme of BLAST type. The critical data are transmitted using the robust mode, the non-critical data being transmitted using one of the two multi-antenna modes. The high-speed mode is selected when the rank RH of the matrix H exceeds a previously chosen threshold value SR.

9 Claims, 5 Drawing Sheets

(56) References Cited

U.S. PATENT DOCUMENTS

| | | |
|---|---|---|
| 2006/0270427 A1 | 11/2006 | Shida et al. |
| 2007/0032246 A1 | 2/2007 | Feher |
| 2007/0280151 A1 | 12/2007 | Zeng et al. |
| 2009/0034639 A1 | 2/2009 | Hwang et al. |
| 2009/0116419 A1 | 5/2009 | Chong et al. |
| 2010/0020907 A1* | 1/2010 | Rezvani et al. ............... 375/347 |

OTHER PUBLICATIONS

Siavash M. Alamouti: "A Simple Transmit Diversity Technique for Wireless Communications," IEEE Journal on Select Areas in Communications, vol. 16, No. 8, Oct. 1998.

Philippe Guguen: "Les techniques multi-antennes pour les reseaux sans fil," [Multi-antenna techniques for wireless networks], Edition Hermes-Lavoisier, 2004.

* cited by examiner

MULTI-ANTENNA COMMUNICATION SYSTEM FOR COMMUNICATING BETWEEN AT LEAST TWO TELECOMMUNICATIONS DEVICES

CROSS-REFERENCE TO RELATED APPLICATIONS

This application is a National Stage of International patent application PCT/EP2010/059119, filed on Jun. 28, 2010, which claims priority to foreign French patent application No. FR 0903132, filed on Jun. 26, 2009, the disclosures of which are incorporated by reference in their entirety.

FIELD OF THE INVENTION

The invention relates to a multi-antenna communication system. It applies notably to the fields of digital communications, signal processing and aerospace communications.

BACKGROUND

When designing digital telecommunications systems, it is important to find a compromise between transmission reliability and transmission speed. As a function of the nature of the processed data, it may be preferable to transmit with a very low error rate but a likewise low speed for given physical resources, whereas in another case, for the same physical resources, the speed will be favored to the detriment of the error rate, that is to say of the robustness.

Concerning telecommunications systems used to transmit data between aircraft and terrestrial stations, between satellites and aircraft, or systems allowing aircraft to communicate directly with one another, the search for the best speed/robustness compromise must therefore be taken into account.

Telecommunications systems customarily have to send and receive a plurality of data streams, each type of stream having constraints in terms of service quality specific thereto. Moreover, the transmission channel varies in the course of time. Techniques make it possible today to adapt the way in which the digital data are transmitted as a function of the type of data, that is to say of the desired service quality, and of the state of the transmission channel. The estimated properties of the transmission channel and the result of this estimation makes it possible to choose a given mode of transmission for a given stream type while taking account of the state of said channel. A mode of transmission corresponds, for example, to the choice of a digital modulation and to the choice of a coding rate if a channel coder is used.

Furthermore, a way of improving speed and/or reliability is to use techniques exploiting transmission diversity. Today, multi-antenna techniques are being increasingly used, whether in mobile telephony or else to install high-speed wireless Internet access points. These techniques rely on M sending antennas and N receiving antennas and make it possible to use the propagation properties not only related to spatial diversity but also related to temporal diversity by installing notably codes of spatial-temporal type, this technique also being called time-space multiplexing. These techniques are customarily designated by the acronym MIMO, which comes from the expression "Multiple Input Multiple Output".

Today, the potential of multi-antenna communications for improving the performance of digital communications in terms of robustness and/or increase in speeds is not used within the context of telecommunications systems involving one or more aircraft.

SUMMARY OF THE INVENTION

An aim of the invention is notably to alleviate the aforementioned drawbacks.

For this purpose the subject of the invention is a system for communications between at least two telecommunications devices, at least one of these devices being onboard an aircraft, said devices comprising means for sending and/or receiving digital data, said data being classed in at least two categories, the first category corresponding to critical data, the second category corresponding to non-critical data. The data are sent on M antennas and received on N antennas. A matrix H of dimension M×N representative of the multi-antenna propagation channel is estimated and the data are sent according to a mode of transmission selected from among at least two multi-antenna modes. A first so-called robust mode uses a scheme of Alamouti type, a second so-called high-speed mode uses a scheme of BLAST type. The critical data are transmitted using the robust mode, the non-critical data being transmitted using one of the two multi-antenna modes. The high-speed mode is selected when the rank RH of the matrix H exceeds a previously chosen threshold value SR.

According to one embodiment, the M sending antennas and the N receiving antennas are arranged in orthogonal polarization diversity.

According to one aspect of the invention, at least one of the telecommunications devices is onboard a pilotless aircraft.

According to another aspect of the invention, at least one of the telecommunications devices is onboard a terrestrial control station.

A terrestrial control station comprises, for example, at least N sub-stations, a sub-station comprising one of the N receiving antennas, said antennas being aligned according to a receiving axis such that they are spaced a distance $d_r$ apart.

For a given sending device, the M sending antennas are, for example, aligned according to a sending axis and spaced a distance $d_t$ apart such that the following expression is complied with:

$$d_t \cdot d_r = \frac{\lambda \cdot L}{\min(M, N) \cdot \cos\theta}$$

in which:

L represents the distance between the sender and the receiving axis;

$\lambda$ represents the wavelength of the signals to be transmitted;

$\theta$ represents the angle between the receiving axis and the sending axis.

According to one embodiment, telecommunications devices are onboard at least two aircraft, said devices allowing them to exchange critical and non-critical digital data by selecting one of the multi-antenna modes.

According to another embodiment, the transmission of data in multi-antenna mode is activated when the aircraft are flying in formation.

The sending and receiving devices comprise, for example, means for estimating their locations, this estimation allowing said devices to deduce the presence or the absence of an exploitable direct path between them, the robust mode being activated in the case of absence.

BRIEF DESCRIPTION OF THE DRAWINGS

Other characteristics and advantages of the invention will become apparent with the aid of the following description, given by way of nonlimiting illustration, offered with regard to the appended drawings, among which.

DETAILED DESCRIPTION

Figure 1:
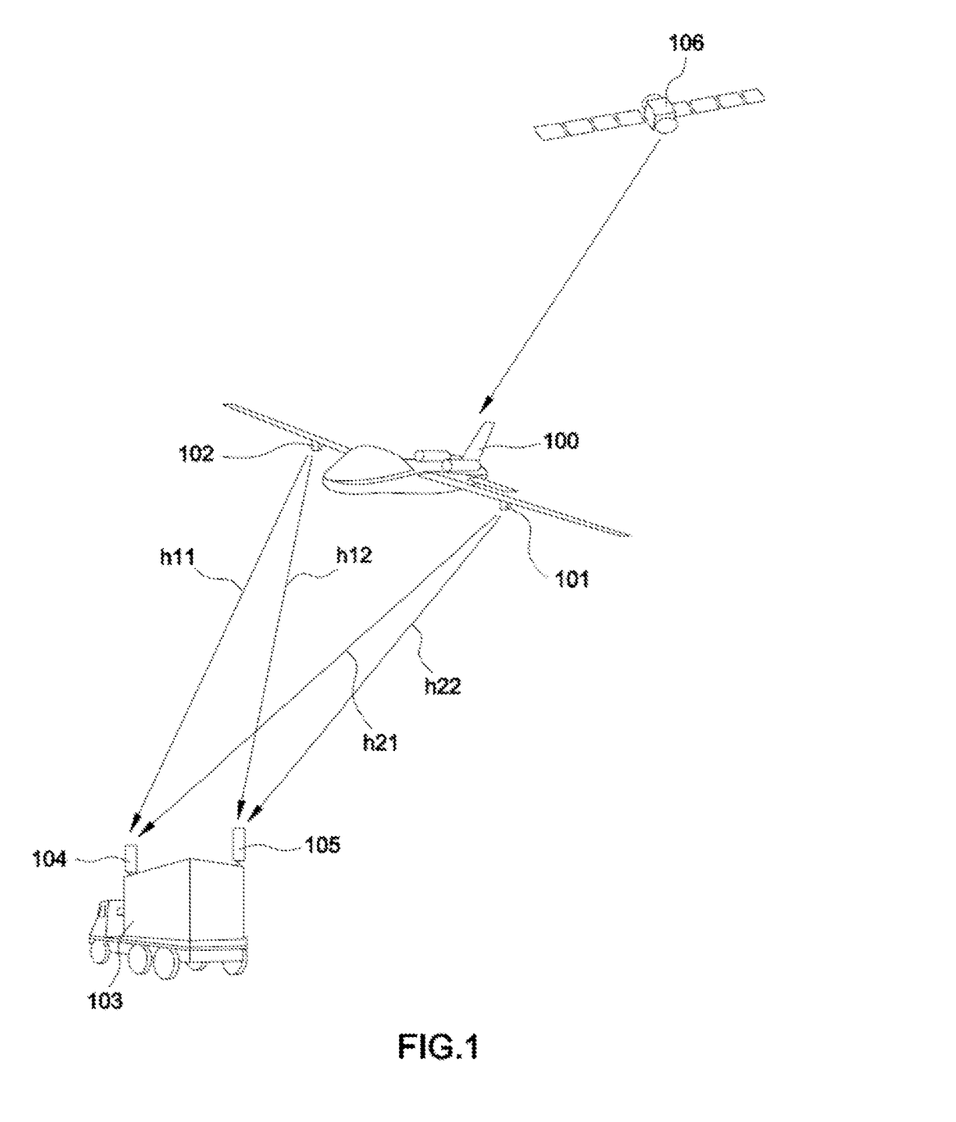
FIG. 1 presents an exemplary communications system according to the invention implementing at least one pilotless airplane.

FIG. 1 presents an exemplary communication system according to the invention implementing at least one pilotless airplane. Drone systems are increasingly being used today, the word drone commonly being used and referring to a pilotless aircraft. Drones are also designated by using the acronym UAV, which comes from the expression "Unmanned Aerial Vehicle". The case of drone systems is used in the subsequent description as exemplary implementation of the subject of the present invention. The communications system according to the invention can also be implemented in other contexts in which one or more aircraft need telecommunications means.

In such a system, data must be conveyed between the drone 100 and a data reception and control station 103. Said station may be a terrestrial station, but not necessarily. The data transmitted are, for example, signaling data allowing the control of the drone or drones from the ground and by its remote pilot. Mission data, called user data in the subsequent description, are also transmitted from the aircraft to the station or stations and correspond to the information acquired, for example with the aid of onboard sensors.

The transmission of the mission data and of the signaling data is performed by telecommunications either in direct line, that is to say when the drone is within range of the control station, or by using a telecommunications relay. This relay is for example a satellite 106, as represented in the figure, but can also be another aircraft, an airplane or a drone for example.

The communication system according to the invention uses a selection of multi-antenna modes to transmit data from an aircraft or from a device onboard this aircraft to at least one of the devices within its range belonging to the system and vice versa. The transmission is performed using M sending antennas and N receiving antennas. In the example illustrated by FIG. 1, a drone 100 sends on M=2 antennas 101, 102 to a terrestrial control station 103 using N=2 receiving antennas 104, 105. The transmission of data from the control station to the drone uses, for example, the same antennas for sending 104, 105 and for receiving 101, 102.

By spacing the antennas sufficiently far apart on the drone and the control station, four potentially independent propagation sub-channels are created, the effect of said sub-channels on the signal being represented by complex coefficients $h_{11}$, $h_{12}$, $h_{21}$, $h_{22}$ associated with each of said channels. The set of these sub-channels represents what in the subsequent description is called a multi-antenna channel.

The aircraft as well as the control station can also use antennas arranged in orthogonal, horizontal/vertical for example, polarization diversity and which have the property of also creating sub-channels that may be decorrelated as a function of the propagation environment. This configuration permits MIMO modes of operation for a small footprint on the surface of the aircraft. On the ground, the antennas may be of one and the same polarization and spatially separated, be co-located but of orthogonal respective polarization, or in a mixed configuration: spatial separation and polarization separation.

For M sending antennas and N receiving antennas, M×N coefficients make it possible to model the effects of the multi-antenna channel. Thus, a matrix H of dimension M×N containing these coefficients may be estimated. The estimation of these coefficients is done, for example, by learning via the dispatching of known pilot symbols. Blind estimation procedures, that is to say without any pilot symbols, can also be used. The dispatching of pilot sequences can be done in both directions of transmission, that is to say in open loop, when the multi-antenna channel is assumed to be reciprocal. The knowledge of the multi-antenna channel can also be transmitted by the receiver to the sender via signaling messages, that is to say in closed loop.

In the example of FIG. 1, the matrix H is of dimension 2×2 and may be written:

$$H = \begin{bmatrix} h_{11} & h_{12} \\ h_{21} & h_{22} \end{bmatrix}$$

This information about the state of the multi-antenna channel makes it possible, for example, to select one mode of transmission rather than another, as explained in the subsequent description. For example, when multiple paths occur as consequences of the propagation environment one mode may be preferred over another.

Figures 2, 3:
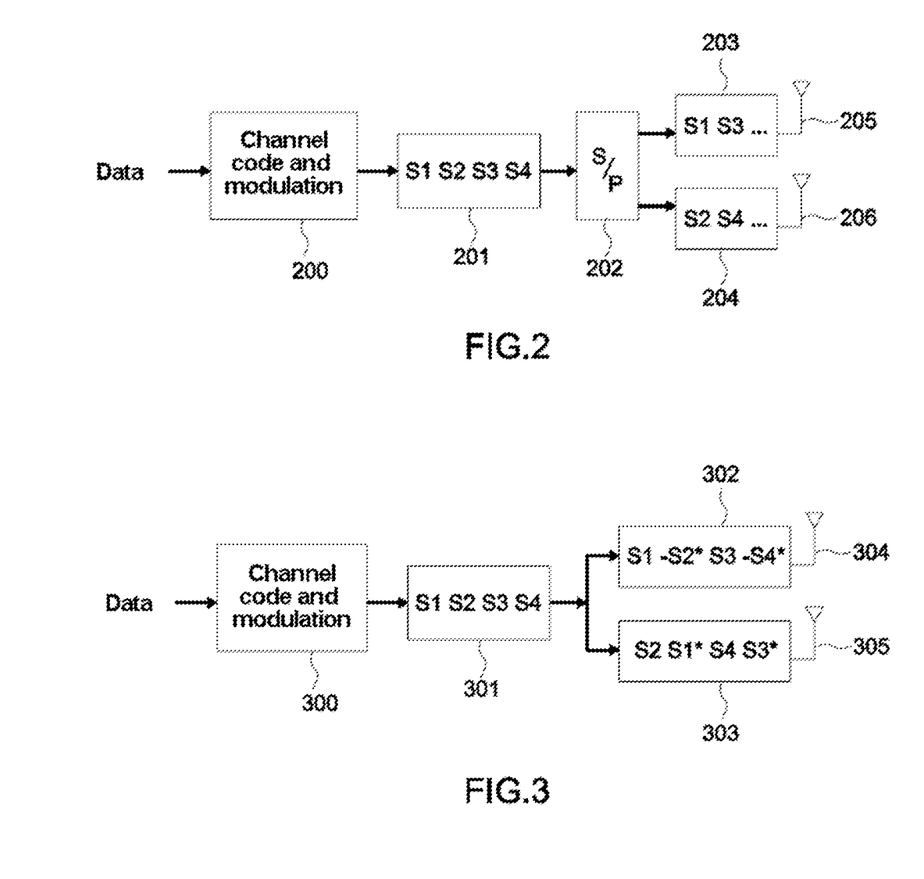
FIG. 2 illustrates the principle of the high-speed scheme of BLAST type.
FIG. 3 illustrates the principle of the Alamouti coding scheme.

FIG. 2 illustrates the principle of the high-speed scheme of BLAST type. The BLAST scheme, the acronym coming from the expression "Bell Labs Layered Space Time", forms part of multi-antenna techniques using time-space multiplexing.

This scheme makes it possible to increase the transmission speed by using the degrees of freedom that are introduced by the spatial modes of the transmission channel and by transmitting different symbols on each sending antenna. The speeds obtained are high when the multi-path profile is rich, that is to say the number of multiple paths is significant. Thus it is theoretically possible to multiply the speed that would be obtained with a single propagation pathway by the coefficient Min(N, M). In the case of a system where M=2 and N=2, the speed may be doubled.

Several variants of this scheme exist, designated by the acronyms D-BLAST, V-BLAST and H-BLAST.

One of the multi-antenna modes that may be used by the system according to the invention is called the high-speed mode and corresponds to a transmission of data on M≥2 antennas with the use of the scheme of a spatio-temporal coding of BLAST type.

When the high-speed mode is activated, the digital data to be transmitted are processed by a channel coder followed by a digital modulator 200, the channel coder adding redundancy bits to the data words to be transmitted and the modulator generating complex symbols on the basis of the bits resulting from the channel coding. The type of channel coding as well as the coding rate may be adapted, for example, as a function of the quantity of data to be transmitted and of the result of the estimation of the transmission channel. A flow of symbols 201 resulting from the selected modulation is thereafter processed in groups of two symbols with the aid of a series/parallel converter 202. Thus, when a V-BLAST scheme is used, for a series of four symbols S1, S2, S3 and S4 output by the modulator, the symbols S1 and S3 are transmitted on a first track 203 associated with a first antenna 205 and the symbols S2 and S4 are transmitted on a second track 204 associated with a second antenna 206.

The ground echo or the sea echo resulting from the signal sent very often creates a distinct mode which customarily acts as an interfering signal. If the high-speed mode is used, these echoes may advantageously be used in reception.

Even in the case of a transmission in direct view, communications of this type being called "Line-of-Sight" or "LOS" communications, the echoes from the ground, sea, buildings, surrounding reliefs and forests, but also the echoes of the aircraft structure, allow the exploitation of the channel's distinct spatial channels for operation in high-speed mode.

The BLAST techniques are described in the book by P. Guguen and G. El Zein entitled *Les techniques multi-antennes pour les réseaux sans fil* [Multi-antenna techniques for wireless networks], Edition Hermes-Lavoisier, 2004.

FIG. 3 illustrates the principle of the Alamouti coding scheme. This coding scheme may be used within the context of the invention as one of the multi-antenna modes that may be selected. Some transmitted data may be crucial. In a drone system, poor operation of the drone and even its loss may be the consequence of the loss of signaling data.

The Alamouti coding scheme makes it possible to render the transmission of these critical data more robust. Accordingly, within the context of the system according to the invention, this scheme is used in a multi-antenna mode called the robust mode in the subsequent description. The Alamouti scheme is also designated by the acronym STTD, which comes from the expression "Space Time Transmit Diversity".

This coding scheme is presented in the paper by Siavash M. Alamouti entitled *A Simple Transmit Diversity Technique for Wireless Communications*, IEEE Journal on Select Areas in Communications, Vol. 16, No. 8, October 1998.

When the robust mode is used, the digital data to be transmitted are processed initially by a channel coder followed by a digital modulator 300, and then the modulated symbols S1, S2, S3 and S4 301 are coded independently for each of the M sending tracks. For example, if M=2, the result of the coding per track may be described by virtue of the following expressions:

Track 1: S1, −S2*, S3, −S4*
Track 2: S2, S1*, S4, S3* in which the star * represents the complex complement.

Stated otherwise, the nth symbol Sn and the next Sn+1 are distributed per track such that:

Track 1: Sn, −Sn+1
Track 2: Sn+1, Sn*

The Alamouti scheme and its variants is aimed at improving the transmission efficiency. This result is due to the diversity gain.

One of the advantages of this mode is that if two sending antennas are required for its implementation, any number of antennas N≥1 may be chosen for reception.

Figure 4:
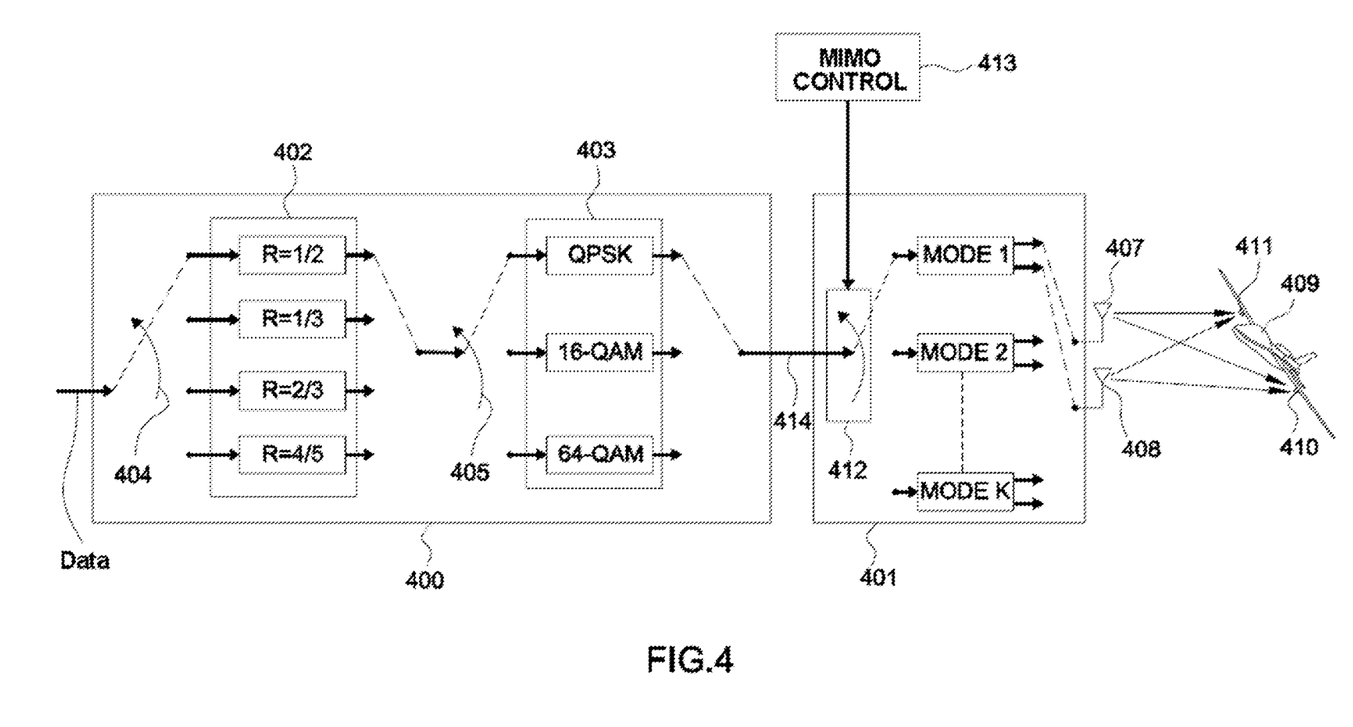
FIG. 4 gives an exemplary digital communication chain according to the invention.

FIG. 4 gives an exemplary digital communication chain according to the invention. As explained previously, the data to be transmitted are processed by a module 400 carrying out the channel coding and the conversion of the bits output by the coder into modulated symbols. The coding rate R may be adapted 404. Thus several coding configurations may be chosen 402, a configuration corresponding for example to a value of R and to a type of coding, said coding possibly being, for example, of convolutional coding, turbo-code, LDPC or other type. A digital modulation can also be selected 405 from among several 403. In the example of the figure, three types of modulation may be selected:

QPSK, in this case a modulated symbol corresponds to 2 bits;

16-QAM, in this case a modulated symbol corresponding to 4 bits;

64-QAM, in this case a modulated symbol corresponding to 8 bits.

There are numerous prior art procedures that make it possible to choose the type of channel coding as well as the type of modulation, while taking account, for example, of the quality of the transmission channel, of the transmission power and of the quantity of data to be transmitted.

The flow of symbols which is thus generated 414 is thereafter input to a module for selecting the multi-antenna mode 401. Thus, a multi-antenna mode may be selected from among K modes. For example, the two modes described previously in the description, that is to say the robust mode and the high-speed mode, may be implemented.

Mode selection 412 is done by using a multi-antenna mode selection algorithm 413, an exemplary algorithm being given hereinafter.

Figure 5:
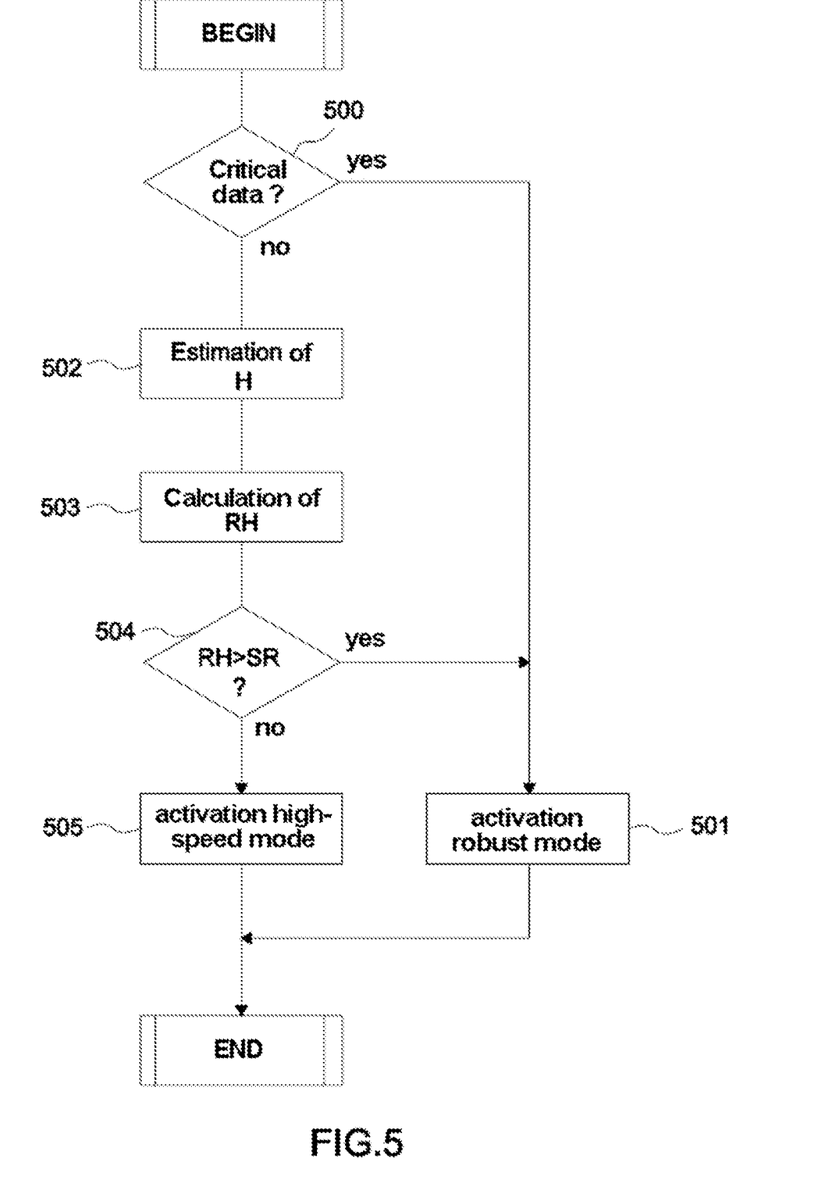
FIG. 5 gives an exemplary algorithm for selecting multi-antenna mode.

FIG. 5 gives an exemplary algorithm for selecting multi-antenna mode.

In this example, the type of data to be transmitted is checked 500. If said data are critical, the robust mode is activated 501. Otherwise, the matrix H is estimated 502 on the basis, for example, of the pilot sequences received.

The rank RH of the matrix H, that is to say the number of eigenvalues of this matrix, is estimated 503. By definition, 0≤RH≤min (M, N). If there are no multi-paths, RH equals 1, whereas if there are, RH is strictly greater than 1.

As a function of the value of RH, a decision is made as to whether to activate the robust mode or the high-speed mode. Thus, the value of RH is compared 504 with a threshold value SR, SR possibly being equal to 1 for example. If RH≤S. SR, the robust mode is activated 501. If RH>SR, the high-speed mode is activated 505.

In a more general case, when a multi-antenna mode has to be chosen from among K modes, K increasing threshold values $SR_1, SR_2, \ldots, SR_K$ are defined such that the kth mode is selected if $SR_{k+1} > RH \geq SR_k \ldots$ for $k \in [1; K-1]$.

Figure 6:
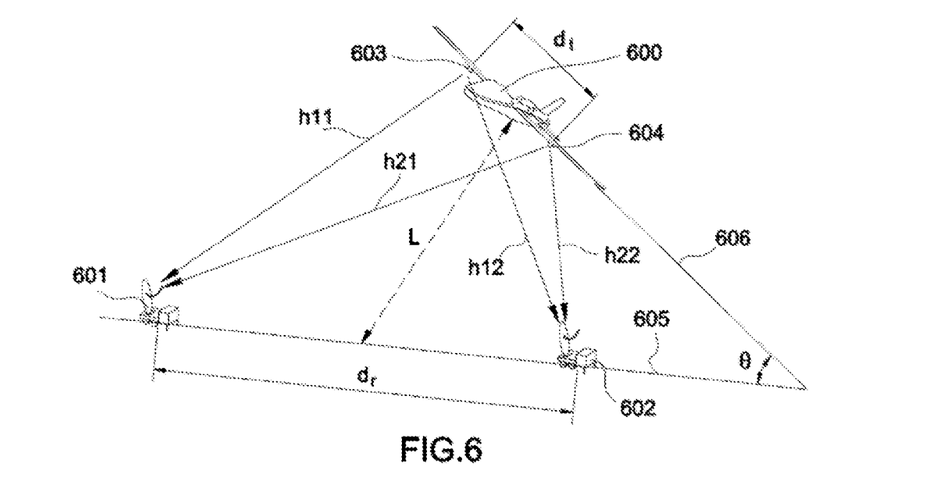
FIG. 6 presents an exemplary implementation of the system with a multi-site distribution of the antennas.

FIG. 6 presents an exemplary implementation of the system with a multi-site distribution of the antennas.

When the system devices that have to communicate with one another are in direct view, it is customary to find a direct path of high power but also exploitable spatial paths as mentioned previously. However in certain particular geographical configurations, few secondary paths are exploitable. It is then judicious to distribute the antennas of one and the same receiving station over several sub-stations that may be aligned along a chosen axis.

The example of FIG. 6 presents an aircraft 600 seen in the guise of sender using 2 antennas 603, 604, spaced a distance $d_t$ apart, said antennas being aligned along a sending axis, and a receiving station composed of 2 antennas 601, 602, these latter being placed on two distinct sub-stations 601, 602 along a chosen receiving axis 605 and are spaced a distance $d_r$ apart. One of these sub-stations or else a third sub-station, not represented, may be in charge of the demodulation and decoding processing to be carried out on the two streams resulting from the reception of the two antennas.

A matrix H of the MIMO channel may be estimated, said matrix being composed of the complex coefficients $h_{11}$, $h_{12}$, $h_{21}$, $h_{22}$ associated with each sub-channel.

To obtain good performance, it is advantageous to comply with a design rule defined by the following expression:

$$d_t \cdot d_r = \frac{\lambda \cdot L}{\min(M, N) \cdot \cos\theta}$$

in which expression:

$d_t$ represents the distance between sending antennas;

$d_r$ represents the distance between receiving antennas;

L represents the distance between the sender and the receiving axis;

$\lambda$ represents the wavelength of the signals to be transmitted;

$\theta$ represents the angle between the receiving axis 605 and the sending axis 606.

Line-of-sight MIMO communications are studied in the paper by F. Bohagen, P. Orten and G. E. Oien entitled *Construction and Capacity Analysis of High-Rank Line-of-Sight MIMO Channels*, IEEE Wireless Communications and Networking Conference, pages 432-437, Vol 1, 13-17 Mar. 2005.

Figure 7:
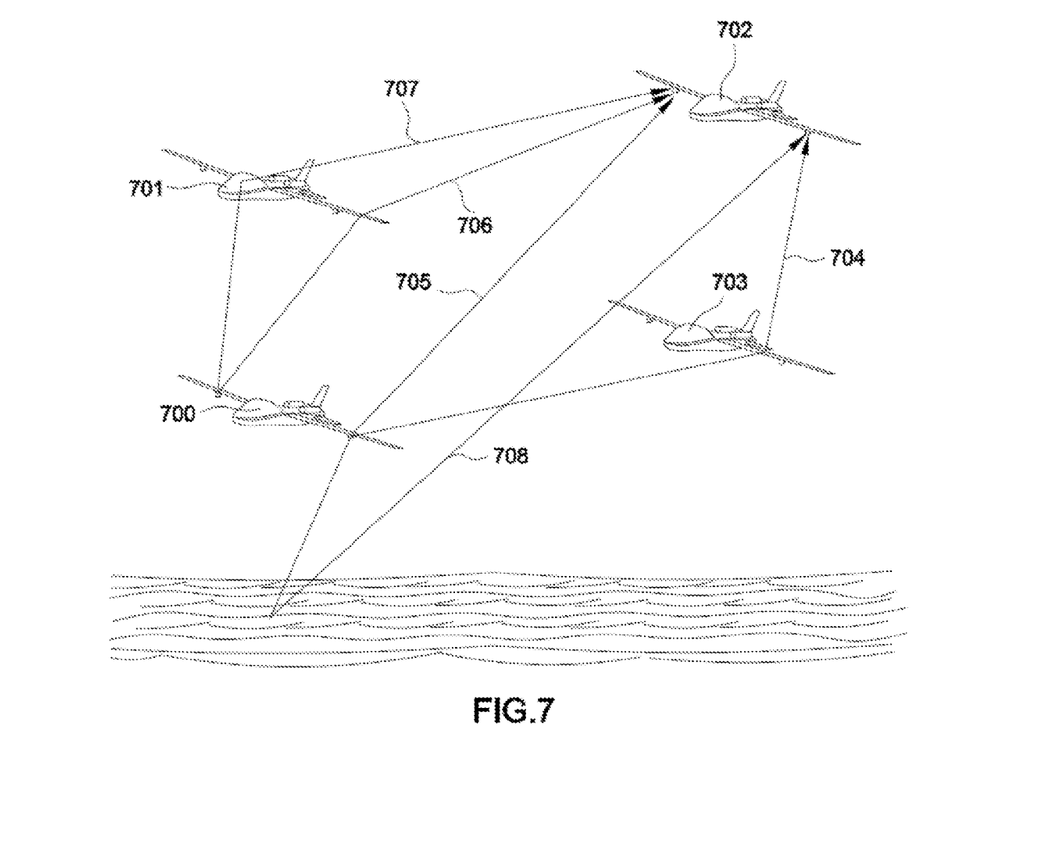
FIG. 7 gives an exemplary implementation of the system according to the invention in which several aircraft are communicating with one another.

FIG. 7 gives an exemplary implementation of the system according to the invention in which several aircraft are communicating with one another. When several aircraft 700, 701, 702, 703 are flying in formation and have means for communicating directly with one another, multiple paths occur, the latter resulting from reflections and from refractions of the signals sent on the various aircraft making up said formation. Likewise, over the sea, there is a propagation path for the wave that allows the use of the high-speed mode. The multi-antenna system according to the invention can therefore advantageously be implemented in this context. Thus, when several aircraft are flying in formation, the activation of the multi-antenna modes is decided manually by the pilot or pilots, by an arbitrary operator of the system or else automatically.

The example of formation flight in the figure illustrates the occurrence of multiple paths. The formation is composed of a lead aircraft 700, of two lateral aircraft 701, 703 and of a tail aircraft 702. Several signal paths resulting from the transmissions of the lead aircraft 700 are received by the tail aircraft 702. One of them is a direct path 705 since the two aircraft are in direct line of sight, another path 704 results from a reflection on a wing of the left lateral aircraft 703, another path 706 results from a reflection on a wing of the right lateral aircraft 701 and a path 707 results from a reflection on the cockpit of the right lateral aircraft 701. A sea path 708 contributes permanently to the high speed.

As in the case of drone systems, fighter-type aircraft for example, have critical data to be transmitted.

For example, the users of a theater of operations are linked by communication means supplying them with tactical information originating from radars or from an identification facility, as well as inter-weapon coordination data, with the aim of providing the pilot with an accurate representation of said theater.

Moreover it may be useful for the aircraft to be able to exchange less sensitive data at high speed, such as for example files or images. Accordingly, the robust mode or the high-speed mode may be selected by using notably the algorithm described with the aid of FIG. 5.

One of the multi-antenna modes can also be activated when the aircraft are not in formation. The movements of the sender with respect to the receiver create propagation attenuations on an antenna, compensated by the diversity gain. Consequently the activation of one of the multi-antenna modes can also be one chosen by using an "a priori" function of the angles of altitude of the airplane and of the location of the receiver, said location being transmitted, for example, in signaling messages. For example, when the airplane or the drone and also the control station know by geolocation that their reciprocal transmissions are blacked out, that is to say there is no direct path or else that said path is not exploitable, by a mountain chain or any relief situated between them, communications switch automatically or manually to robust mode.

The airplane's attitude angles may be provided to the communication system by the aircraft's navigation platform. It is these angles which can also be exploited to switch to robust mode.

Likewise, in the case where an onboard satellite link allowing a backup mode is such that it is blacked out temporarily or permanently by the propagation conditions (rain), the reliefs (steep-sided valley), or the movements of the airplane (fast movements, acrobatics) and that there is no longer any redundant satellite link, communications switch automatically or manually to robust mode.

The invention claimed is:

1. A system for communications between at least two telecommunications devices, at least one of these devices being onboard an aircraft, said devices comprising means for sending and/or receiving digital data, said data being classed in at least two categories, the first category corresponding to critical data, the second category corresponding to non-critical data, wherein the data are sent on M antennas and received on N antennas, a matrix H of dimension M×N representative of the multi-antenna propagation channel being estimated, the data being sent according to a mode of transmission selected from among at least two multi-antenna modes, a first robust mode using a scheme of Alamouti type, a second high-speed mode using a scheme of BLAST type, the critical data being transmitted using the robust mode, the non-critical data being transmitted using one of the two multi-antenna modes, the high-speed mode being selected when the rank RH of the matrix H exceeds a previously chosen threshold value SR.

2. The communications system as claimed in claim 1, wherein the M sending antennas and the N receiving antennas are arranged in orthogonal polarization diversity.

3. The communications system as claimed in claim 1, wherein at least one of the telecommunications devices is onboard a pilotless aircraft.

4. The communications system as claimed in claim 1, wherein at least one of the telecommunications devices is onboard a terrestrial control station.

5. The communications system as claimed in claim 4, wherein a terrestrial control station comprises at least N sub-stations, a sub-station comprising one of the N receiving antennas, said antennas being aligned according to a receiving axis such that they are spaced a distance $d_r$ apart.

6. The communications system as claimed in claim 5, wherein, for a given sending device, the M sending antennas are aligned according to a sending axis and spaced a distance d.sub.t apart such that the following expression is complied with:

$$d_t \cdot d_r = \frac{\lambda \cdot L}{\min(M, N) \cdot \cos\theta}$$

in which:
L represents the distance between the sender and the receiving axis; λ represents the wavelength of the signals to be transmitted; θ represents the angle between the receiving axis and the sending axis.

7. The communications system as claimed in claim 1, wherein telecommunications devices are onboard at least two aircraft, said devices allowing them to exchange critical and non-critical digital data by selecting one of the multi-antenna modes.

8. The communications system as claimed in claim 7, wherein the transmission of data in multi-antenna mode is activated when the aircraft are flying in formation.

9. The communications system as claimed in claim 1, wherein the sending and receiving devices comprise means for estimating their locations, this estimation allowing said devices to deduce the presence, or the absence of an exploitable direct path between them, the robust mode being activated in the case of absence.

\* \* \* \* \*